Oct. 18, 1960     J. M. SAMALION     2,956,529
BOAT ANCHOR AND TRAILER STAND
Filed Feb. 26, 1958
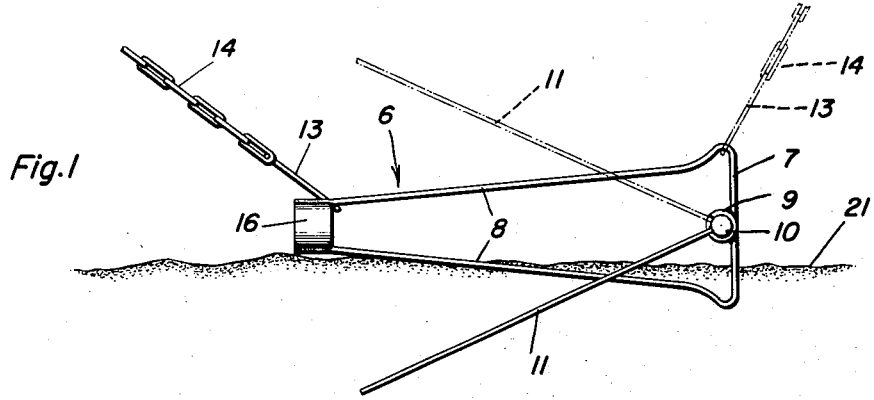
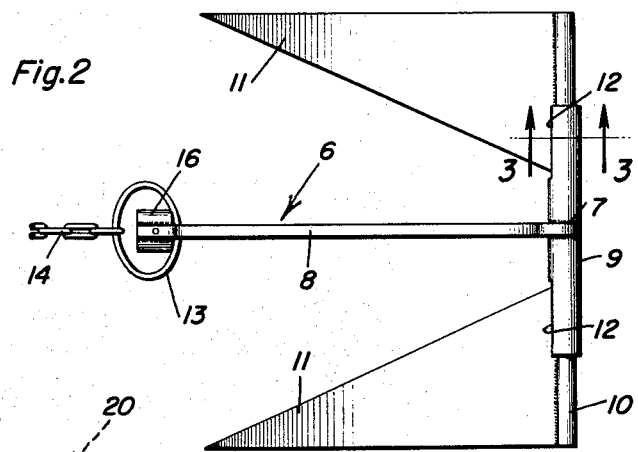
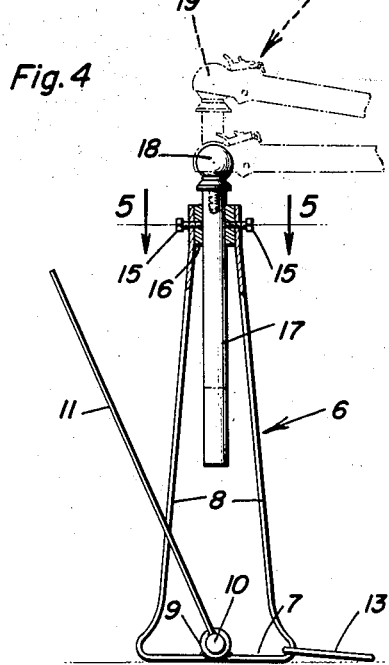
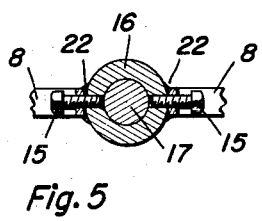
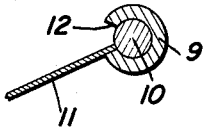
Joseph M. Samalion
*INVENTOR.*

2,956,529
BOAT ANCHOR AND TRAILER STAND

Joseph M. Samalion, 2720 SW. 29th Ave., Miami, Fla.

Filed Feb. 26, 1958, Ser. No. 717,667

2 Claims. (Cl. 114—208)

The present invention relates to new and useful improvement in boat anchors and has for its primary object to provide, in a manner as hereinafter set forth, a device of this character which is also adapted to function as a support or stand for trailers, particularly boat trailers.

Another important object of the invention is to provide a combination device of the aforementioned character which, when used as a boat trailer support or stand, may be expeditiously adjusted vertically as desired.

Other objects of the invention are to provide a combination boat anchor and trailer stand of the character described which will be comparatively simple in construction, strong, durable, compact and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a view in side elevation showing a device embodying the present invention in use as an anchor;

Figure 2 is a plan view thereof;

Figure 3 is an enlarged view in cross section, taken substantially on the line 3—3 of Figure 2;

Figure 4 is a view in side elevation with the upper portion of the device broken away in vertical section, showing said device in use as a boat trailer support or stand; and Figure 5 is a view in horizontal section, taken substantially on the line 5—5 of Figure 4.

Referring now to the drawing in detail, it will be seen that the embodiment of the invention which has been illustrated comprises a substantially U-shaped shank of suitable metal which is designated generally by reference character 6. The shank 6, which may also be of any suitable dimensions, comprises a base or bight portion 7 and upwardly convergent legs 8.

Fixed transversely on the bight portion 7 of the shank 6 is a tubular bearing 9 of suitable metal. A shaft 10 is journalled for rocking movement in the bearing 9 and projects beyond the ends thereof. Fixed on the shaft 10 on opposite sides of the shank 6 is a pair of flukes 11. The flukes 11 are operable in longitudinal slots 12 which are provided for said flukes in the end portions of the tubular bearing 9. Thus, the swinging movement of the flukes 11 in opposite directions is positively limited, as indicated in Figure 1 of the drawing.

Slidably mounted on the shank 6 is a metallic ring or link 13. The ring 13 provides means for connecting one end of an anchor chain 14 to the shank 6.

Secured by screws 15 between the upper end portions of the legs 8 of the shank 6 is a metallic ring 16. Secured for vertical sliding adjustment in the ring 16 is a removable post 17. The screws 15 also secure the post 17 in adjusted position in the ring 16. Mounted on the upper end of the post 17 is a ball 18 for engagement in the usual socket 19 of a conventional trailer hitch 20.

It is throught that the use of the device will be readily apparent from a consideration of the foregoing. Briefly, when the device is used as an anchor, as seen in Figure 1 of the drawing, said device lies on either side and the flukes 11 are adapted to dig into the bottom of the body of water, as indicated at 21, in an obvious manner. It will be observed that the anchor chain 14 is shiftably connected to the shank 6. When the device is to be raised the boat is maneuvered to shift the chain 14 to the position shown in dotted lines in Figure 1 of the drawing, after which the flukes 11 may be easily extracted from the bottom 21 or disengaged from a snag. The anchor may lie on either side, the ring 13 being sufficiently large to pass over the elements 15 and 16 on one end portion of the shank 6. When the device is to be used as a boat trailer support or stand the bight portion 7 and the members 9 and 10 function as a base. With the shank 6 in an upright position the post 17 is inserted in the ring 16 and secured in adjusted position by tightening the screws 15 on said post. As indicated at 22, the ring 16 may also be soldered or welded to the legs 8 of the shank 6.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A combination boat anchor and trailer stand comprising: a substantially U-shaped shank including a bight portion providing a base and a pair of convergent legs, a tubular member fixed transversely on said base, a shaft mounted in said tubular member, at least one fluke secured to said shaft, means associated with said tubular member for establishing limits for the movement of said fluke and said shaft with respect to said tubular member, a ring fixed between the free end portions of the legs, a removable post mounted for sliding adjustment in said ring, means for securing the post in adjusted position, and means on one end of the post engageable in a portion of a trailer hitch.

2. A combination boat anchor and trailer stand comprising: a substantially U-shaped shank including a bight portion and a pair of convergent legs, a tubular bearing fixed transversely on said bight portion, a shaft journalled for limited rocking movement in said bearing, flukes fixed on said shaft, a ring slidable on the legs for shiftably connecting an anchor chain thereto, a ring fixed between the free end portions of the legs, a removable post mounted for sliding adjustment in the second named ring, and a ball on one end of said post engageable in the socket of a trailer hitch.

References Cited in the file of this patent

UNITED STATES PATENTS

| | | |
|---|---|---|
| 2,321,901 | Eddy | June 15, 1943 |
| 2,612,131 | Benedict | Sept. 30, 1952 |
| 2,651,277 | Jenshak | Sept. 8, 1953 |
| 2,722,191 | Johnson | Nov. 1, 1955 |

FOREIGN PATENTS

| | | |
|---|---|---|
| 1,096,830 | France | Feb. 9, 1955 |